Oct. 19, 1954　　F. A. CLARY, JR., ET AL　　2,692,046
MACHINE FOR GAUGING AND SORTING BALLS
Filed Nov. 15, 1949　　　　　　　　　　　　　　5 Sheets-Sheet 3

INVENTOR.
FRANK A. CLARY, JR.
GRANT N. WILLIS
BY Owen W. Kennedy
ATTORNEY

Oct. 19, 1954   F. A. CLARY, JR., ET AL   2,692,046
MACHINE FOR GAUGING AND SORTING BALLS
Filed Nov. 15, 1949   5 Sheets-Sheet 4
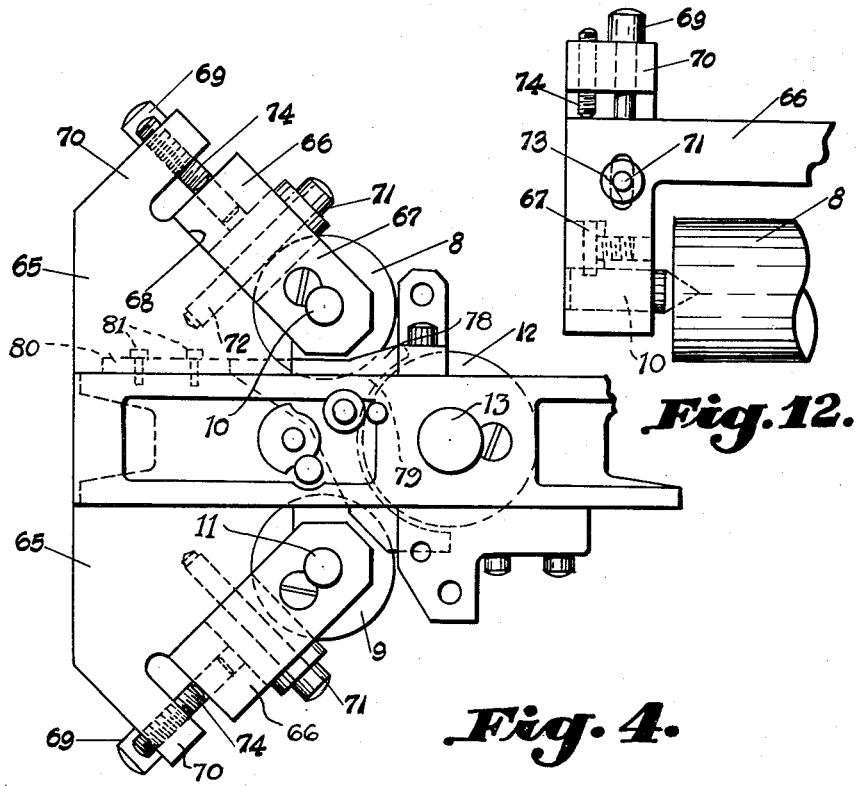
Fig. 12.
Fig. 4.
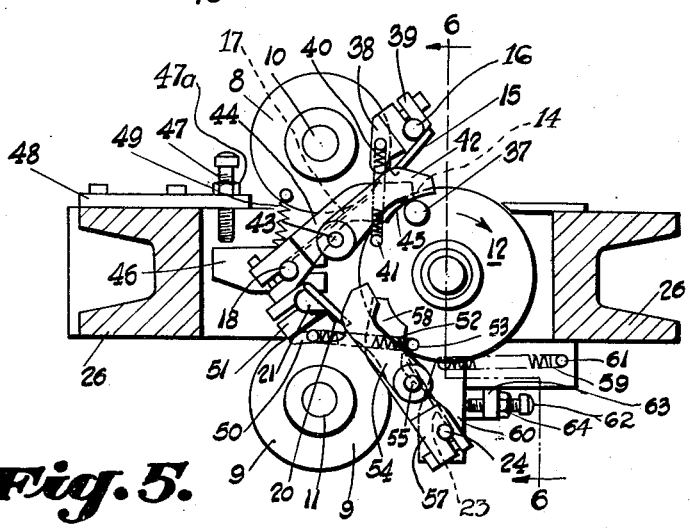
Fig. 5.
INVENTOR.
FRANK A. CLARY, JR.
GRANT N. WILLIS
BY
Owen W. Kennedy
ATTORNEY Oct. 19, 1954     F. A. CLARY, JR., ET AL     2,692,046
MACHINE FOR GAUGING AND SORTING BALLS
Filed Nov. 15, 1949     5 Sheets-Sheet 5

INVENTOR.
FRANK A. CLARY, JR.
GRANT N. WILLIS
BY
Owen W. Kennedy
ATTORNEY

Patented Oct. 19, 1954

2,692,046

UNITED STATES PATENT OFFICE 2,692,046

MACHINE FOR GAUGING AND SORTING BALLS

Frank A. Clary, Jr., and Grant N. Willis, Bristol, Conn., assignors to Pioneer Steel Ball, Incorporated, Unionville, Conn., a corporation of Connecticut Application November 15, 1949, Serial No. 127,334

5 Claims. (Cl. 209—101)

The present invention relates to an improved machine for gauging and sorting round objects, such as balls, according to their size, with the same machine also being adapted to detect the existence of flats in the spherical surfaces of the balls being handled, and to segregate such defective balls.

The machine of the present invention is particularly adapted for the gauging and sorting of balls of the type that are used extensively in the assembly of ball bearings, wherein the preliminary gauging of such balls is of the utmost importance, since the producers of ball bearings must have absolute assurance that balls used for any given size of bearing are all of exactly the same diameter, measured in thousandths of an inch, as well as being free of surface defects.

In the production of balls that are to be used for ball bearings, it is customary for ball manufacturers to make large numbers of highly finished balls that differ only very slightly in diameter, as a result of variations in the ball finishing operations, and the object of the present invention is to provide a machine for quickly and accurately gauging a large number of balls at one time, and to separate the balls of any group into balls of standard size, oversize, and undersize, with added provision for identifying and rejecting balls with surface defects, such as flats. Briefly stated, the machine of the present invention is characterized by its ability to gauge and classify a large number of balls at one time, as delivered to the gauging instrumentalities from a feed hopper, in separate series, with the gauging instrumentalities automatically functioning in such a manner that several series of balls are passing through the machine at one time in a predetermined sequence, with each series being subjected to the same gauging operations. Furthermore, the machine so functions that each series of balls is subjected to an examination when in the first gauging position, for the purpose of detecting flats and rejecting such defective balls, even though such balls be otherwise of the correct size.

The above and other advantageous features of our invention will hereinafter more fully appear from the following description considered in connection with the accompanying drawings, in which—

Fig. 4 is a view in end elevation showing the parts of the gauging roll assembly apart from the ball feeding mechanism.

Fig. 5 is a sectional view looking at the left-hand end of the selector roll, and showing the baffle and gate operating mechanism.

Fig. 12 is a partial plan view of the mechanism for adjusting a gauging roll.

Figure 1:
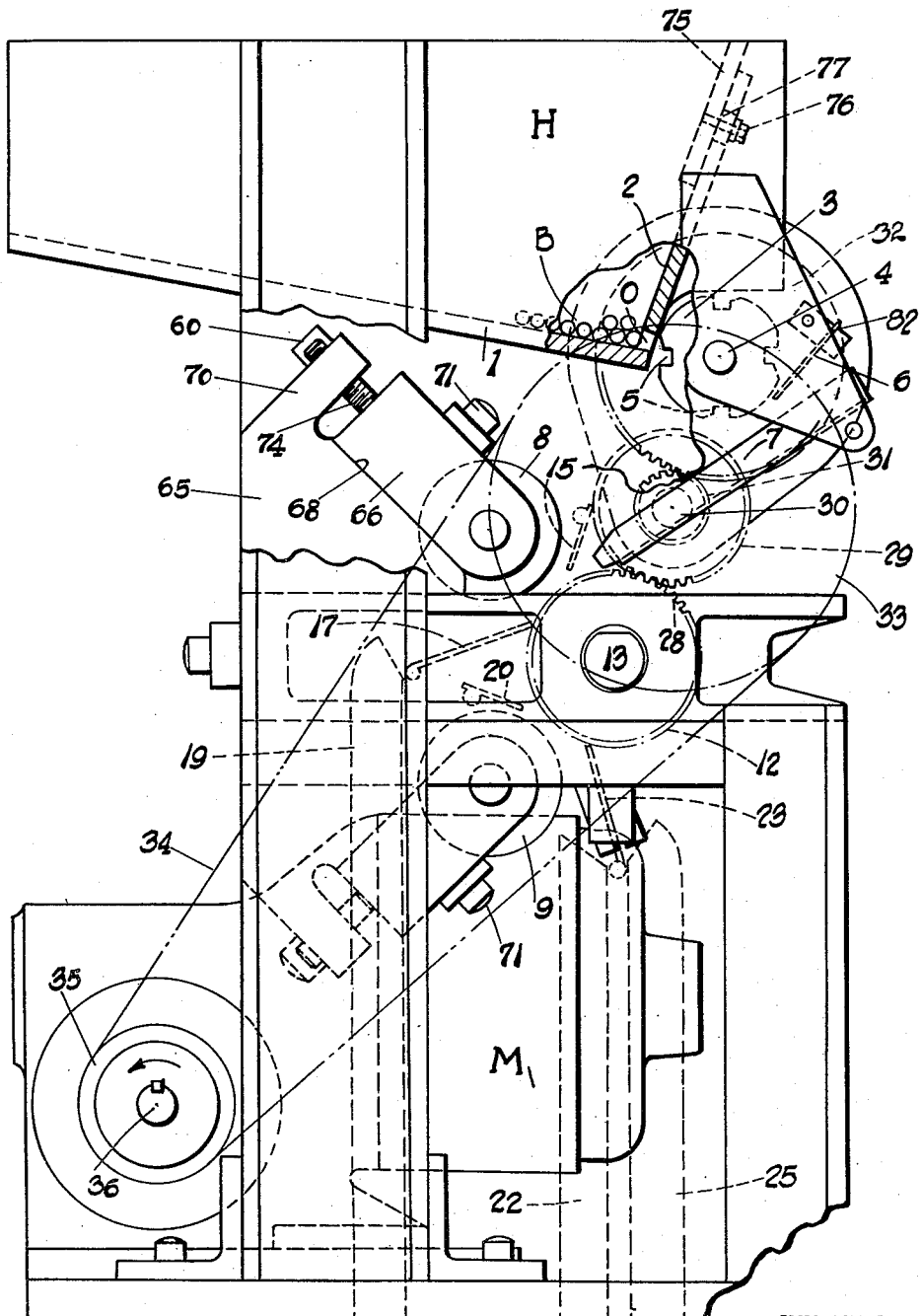
Fig. 1 is a view in side elevation of a ball gauging machine embodying the present invention, with certain parts shown in section.
Figure 2:
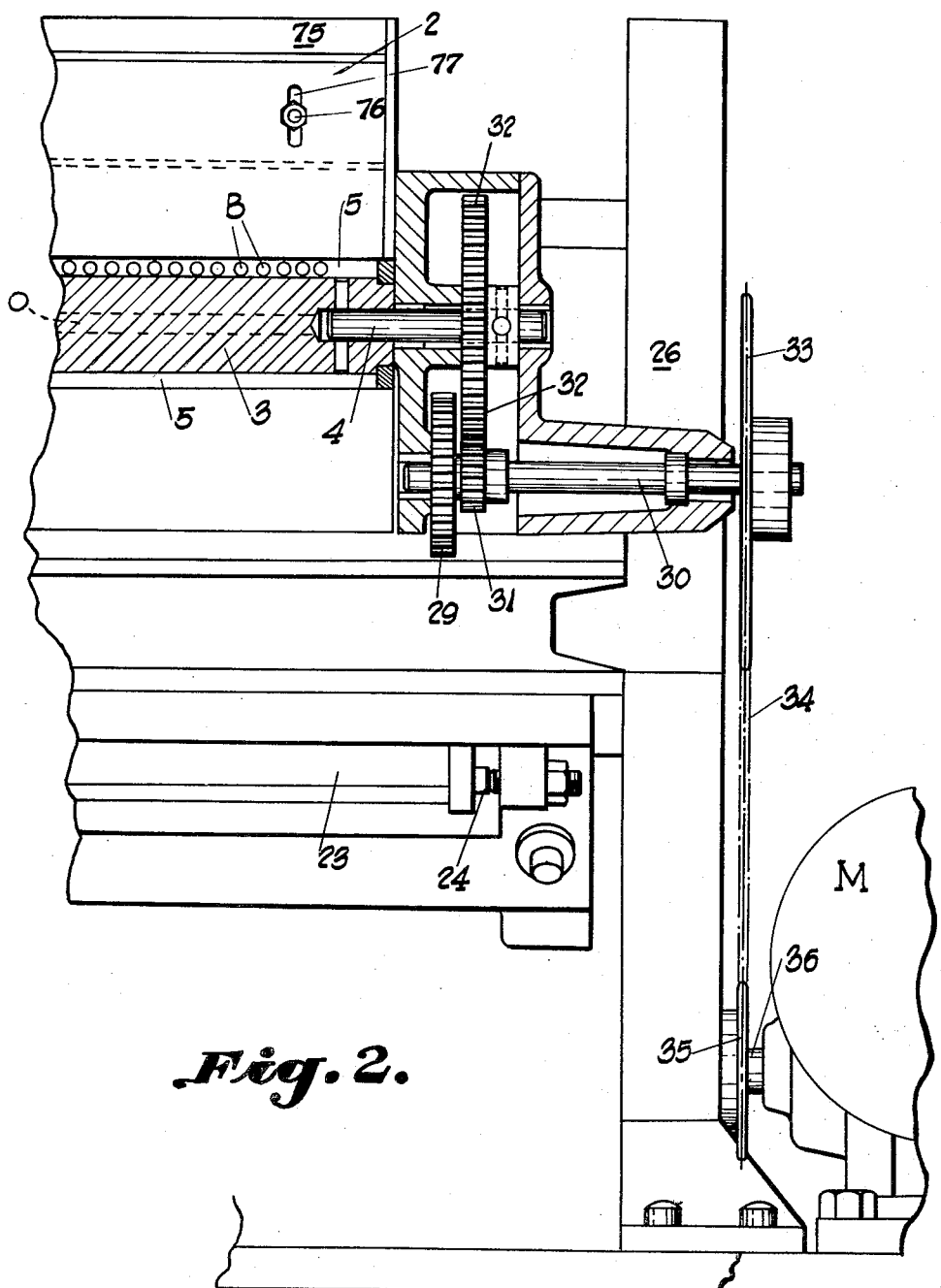
Fig. 2 is a view in front elevation of the right-hand portion of the machine shown in Fig. 1.
Figure 3:
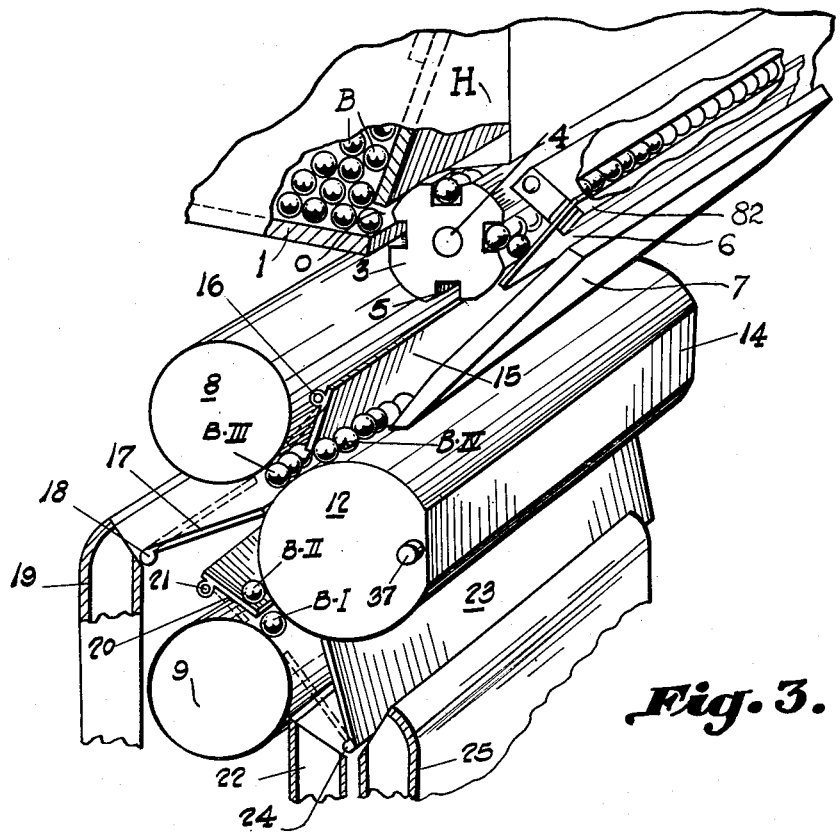
Fig. 3 is a view, partly in perspective and partly in section, for illustrating the essential elements of the machine, with the frame of the machine being removed.

Referring first to Figs. 1, 2 and 3, the essential elements of the machine will first be described to set forth the relation between such elements, without reference to details of construction, which will be gone into later. Generally speaking, the machine consists of a feed hopper H of such capacity as to receive a large number of balls B, the diameters of which may differ by as little as one ten thousandth of an inch. The bottom 1 of the hopper H is inclined downwardly, and an opening O between the bottom and the lower edge of a vertically adjustable feed plate 2 leads to a feed roll 3 rotatable on a shaft 4 extending outside the hopper, and adapted to be driven by any suitable source of power, such as the electric motor M shown in Fig. 1. The surface of the feed roll 3 provides slots 5 extending the length of the roll parallel to the shaft 4, with the slots 5 being of uniform width and depth so as to freely receive the largest balls B that are contained in the hopper H. Therefore, when the hopper H is filled with balls B, they tend to arrange themselves in rows in the feed roll slots 5, as these slots pass by the hopper opening O, see Fig. 3.

With the parts occupying the position of Fig. 3, a slot 5 filled with balls B, has been moved into substantial engagement with a ball-aligning member 6 of the hopper H, just above a downwardly inclined hopper chute 7. A fourth slot 5 is shown empty, by reason of having already discharged its series of balls into the chute as the roll 3 rotates in the direction of the arrow, and it is to be noted that the leading edge of each slot 5 is beveled, as shown in Figs. 1 and 3, so as to expedite the entry and discharge of a series of balls, as a slot passes the opening O and then travels around to the top of the chute 7 into ball-discharging position.

As shown through the broken-away portion of the hopper in Fig. 3, each feed roll slot 5 is filled with a large number of balls, with the number of slots depending upon the basic diameter of the balls B. For example, each slot 5 will receive about fifty balls having an average diameter of .250", for each twelve inches of hopper width. Therefore, with a machine having a hopper only 1 ft. wide, each revolution of the feed roll 3 will result in delivering 200 balls to the hopper chute 7, for operation upon, in consecutive series each containing 50 balls, by gauging and sorting devices for separating the balls and delivering them into suitable containers, in accordance with whether the balls are of the correct size, oversize, or undersize, as well as in accordance with the existence of surface defects, such as flats.

As best shown in Figs. 3 and 5, the gauging and sorting devices consist of a pair of gauging rolls 8 and 9 extending parallel to the feed roll 3 and non-rotatably supported between centers 10 and 11, respectively. A selector roll 12, located in the space between the gauging rolls 8 and 9, is adapted to turn freely between trunnions 13, while it is rotatably driven in the direction of the arrow, preferably from the same source of power as the feed roll shaft 4, with the driving arrangement being such that the selector roll 12 makes four revolutions for each one revolution of the feed roll shaft 4. The centers 10 and 11 carrying the gauging rolls 8 and 9, respectively, are adjustable with respect to the axis of the selector roll 12, by mechanism to be hereinafter described, and the adjustment is such that the cylindrical surface of the roll 8 is spaced from the cylindrical surface of the roll 12 a distance slightly less than the distance between the cylindrical surfaces of the rolls 9 and 12, respectively.

For example, assuming that the machine is set up for gauging and sorting a group of balls having a nominal diameter of .2500", with a tolerance of plus or minus .0005", the distance between the upper roll 8 and the roll 12 will be set at .2495", while the distance between the lower roll 9 and the roll 12 will be set at .2505". In other words, with the particular setup described above, the machine will operate to separate balls that lie between the limits of .2495" and .2505" from those balls which are over or under these limits, as the case may be, as well as from other balls having flats on their surfaces, all as will later appear. Balls whose diameters lie between any given tolerance limits will be considered standard.

The surface of the selector roll 12 is cylindrical, except for the provision of a flat 14 which extends the entire length thereof, and is adapted to move opposite to the cylindrical surfaces of the rolls 8 and 9, once for each revolution of the shaft 13. Therefore, when the flat 14 on the roll 12 moves opposite to the nearest point on the roll 8, it will permit the passage of balls that are greater than .2495" in diameter, while movement of the flat 14 opposite to the nearest point of the roll 9 will permit the passage of balls larger than .2505".

With the above described basic relation between the rolls 8, 9 and 12 in mind, reference will now be made to the schematic showings of Figs. 7 to 11, inclusive, which illustrate functioning of the rolls to automatically separate balls of standard size from undersize and oversize balls, in association with the timed operation of ball controlling baffles and gates, the functioning of which results in the delivery of the selected balls to different storage receptacles. While, as previously pointed out, the machine is adapted to simultaneously perform its intended gauging and sorting operations on four different series of balls as delivered to the chute 7 by the feed roll 3, the operation of the machine will first be outlined with relation to what happens sequentially to any given series of balls, the passage of which through the machine is shown schematically in Figs. 7 to 11, inclusive, without reference to what is also happening to the balls of other series at the same time.

Figure 7:
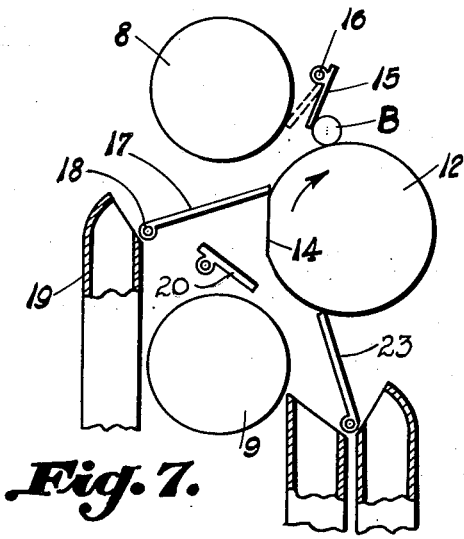
Figs. 7, 8, 9, 10 and 11 are schematic views based on Fig. 5, and illustrating the progress of a single series of balls through the machine.

Referring now to Fig. 7, there a series of balls B is shown as having rolled down the chute 7 so as to engage the moving surface of the roll 12, and to travel down this surface towards the space between the rolls 8 and 12 into engagement with a baffle 15 which is in the form of a plate extending the entire width of the chute 7 into the space between the chute 7 and the roll 8. The baffle 15 is at that time near enough to the roll 12 to prevent further movement of the balls B, although the baffle is later turnable about the axis of a pivot shaft 16 into the position of Fig. 8, so as to permit the entire series of balls to move into the first gauging position.

Figure 8:
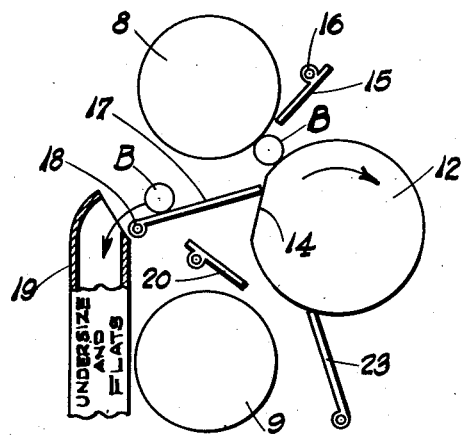

Fig. 8 illustrates the first gauging operation wherein undersize balls are separated from standard balls and oversize balls, this step being initiated by turning of the baffle 15 from the position of Fig. 7 into the position of Fig. 8, by mechanism which will be later described in detail. When this occurs, all of the balls B in the particular series under consideration move, as a group, into the space between the rolls 8 and 12 which, as previously pointed out, will permit the passage of all balls having a diameter of .2495" and under.

In Fig. 8, an undersize ball is shown as having passed between the rolls 8 and 12, whereas the remaining balls of the same series are held from further movement by reason of their diameters being above the lower limit of .2495". As an undersize ball passes between the rolls 8 and 12, it moves downwardly along the surface of a gate 17 that is mounted to turn about the axis of a shaft 18, so that its free end rests on the surface of the roll 12 at that particular stage in the operating cycle of the machine. From the inclined gate 17, the ball rolls downwardly into a container 19 for undersize balls, and since the gate extends the full length of the rolls 8 and 12, all undersize balls will be delivered by the gate 17 to the container 19.

As previously pointed out, the machine is also adapted to function so as to detect and reject balls that are not truly spherical, by reason of having flats on the surfaces thereof. This flat-detecting ability of the machine results from the fact that the selector roll 12 is rotating in a clockwise direction so that its surface is moving upwardly relative to a series of balls B moving downwardly into the space between the rolls 8 and 12, as shown in Fig. 8. This flat-detecting operation takes place immediately following the passage of undersize balls onto the gate 17, and is due to the fact that all the remaining balls spin on their own axes, as a result of the continued turning of the roll 12.

It will be apparent from a consideration of Fig. 8, that most of the weight of any ball in the series is borne by the surface of the roll 12 which, as previously pointed out, is turning in a clockwise direction. This causes the ball to spin, as the roll 12 turns, with such spinning occurring on many different diameters for any given ball, due to continual changes in the axes about which the ball rotates as it undergoes minute sidewise displacements on the roll 12. Therefore, as each ball is individually examined as a result of its spinning, there is opportunity for any diameter which is less than that of the standard diameter, due to the existence of a minute flat spot, to cause the ball to pass between the rolls 8 and 12, and so fall into the container 19 in the same manner as an undersize ball. As a result, all of the balls of a given series arriving at the first gauging station, as shown in Fig. 8, are immediately gauged so as to separate the undersize balls, and the remaining standard size and oversize balls are thereafter individually examined by being spun about constantly varying axes so as to detect flats and cause balls with such flats to pass between the rolls 8 and 12, down the gate 17, and into the container 19, along with low limit diameter balls.

Figure 9:
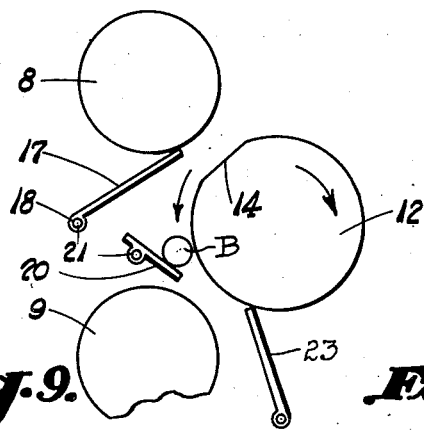

The next step in the operation of the machine consists in moving the gate 17 from the closed position of Fig. 8 into the open position of Fig. 9, slightly before the arrival of the flat 14 on roll 12 at a point opposite to the surface of the upper gauging roll 8. When this occurs, all the balls B that did not pass between the rolls 8 and 12, as a result of being either undersize, or as a result of having flats thereon, will be free to pass between the flat 14 on roll 12 and the surface of roll 8, until they come to rest against a second baffle 20. This baffle 20 is mounted to turn with a pivot shaft 21, so that its free end projects towards the roll 12, and prevents further movement of the released balls toward the space between the lower gauging roll 9 and the selector roll 12.

It is to be noted at this point that the remaining balls B of the series under consideration, will engage the baffle 20 and be lined up for a short interval on the baffle before being released by the baffle 20 into the space between the rolls 9 and 12, which space is set by previous adjustment of the roll 9 so as to be exactly of the same width as the diameter of balls having the upper tolerance diameter, namely, balls having a diameter of .2505", for the example given above. This lining up of the balls by the baffle 20, as shown in Fig. 9, is immediately followed by turning of the baffle with its shaft 21 into the position of Fig. 10, wherein balls of standard size are shown as passing between the rolls 9 and 12 downwardly into the open end of a container 22.

Figure 10:
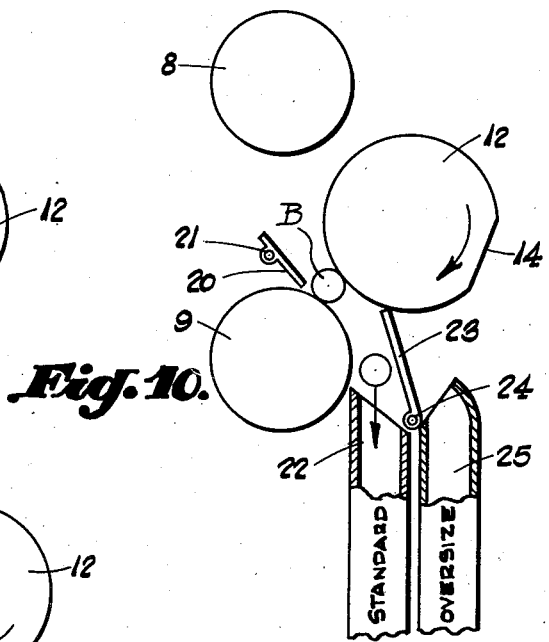

Fig. 10, therefore, illustrates the second gauging of the balls of the same series that were passed by the opening of gate 17, with all oversize balls remaining between the rolls 9 and 12, as indicated, following passage of standard size balls into the container 22. This movement of standard balls into the container 22 is facilitated by a second gate 23 mounted to turn with a shaft 24, so as to have the free edge thereof substantially bearing on the roll 12. In this position of the gate 23, standard balls will be effectively prevented from moving into a third container 25 for oversize balls that is located on the opposite side of the gate shaft 24, with respect to the container 22.

Figure 11:
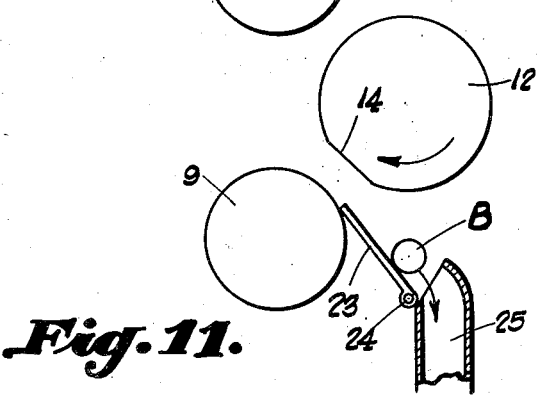

The final separation of oversize balls from standard balls is shown in Fig. 11 as resulting from movement of the flat 14 on roll 12 to a point opposite the surface of roll 9, slightly after the turning of the gate 23 with its shaft 24 from the position of Fig. 10 to the position of Fig. 11. When this occurs, all balls larger than .2505" that were held back as shown in Fig. 10, will be released as the flat 14 arrives in the position of Fig. 11, whereupon these oversize balls will roll down the inclined surface of the gate 23 into the open mouth of the container 25. The fact that the balls rest on the stationary roll 9 in Fig. 10, reduces the possibility of oversize balls, with flats, passing into the container 22 for standard balls.

Following the delivery of oversize balls into the container 25, the gate 23 and the baffle 20 return to the positions of Fig. 9, in readiness for gauging and selecting another series of balls on the next succeeding revolution of the roll 12 and the passage of the flat 14 past the surface of roll 9. It will also be understood that the baffle 15 and the gate 17 will return to the positions of Fig. 7 in readiness for gauging and selecting the next series of balls delivered from the hopper H, after the flat 14 has passed the position of Fig. 7.

As previously pointed out, the shaft 13 of the selector roll 12 is adapted to make four revolutions for each revolution of the feed roll 3, which in turn causes delivery of four series of balls to the gauging and sorting mechanism. For this reason, there are four series of the balls in the machine at all times, following its operation in the above described sequence on the first four series of balls delivered from the hopper by the feed roll 3. That is to say, once the machine has started and has received four consecutive series of balls, thereafter there will always be two series of balls held by the baffles 15 and 20, as shown in Figs. 7 and 9, while two other series of balls are in the gauging positions of Figs. 8 and 10, in readiness to be passed by the flat 14 on the roll 12. As a result, each series of balls delivered by the roll 3 goes through exactly the same sequence, and the particular mechanism for operating the baffles 15 and 20 and the gates 17 and 23 to obtain this sequence, will next be described with particular reference to the enlarged showing of the gauging mechanism in Figs. 5 and 6.

Figure 6:
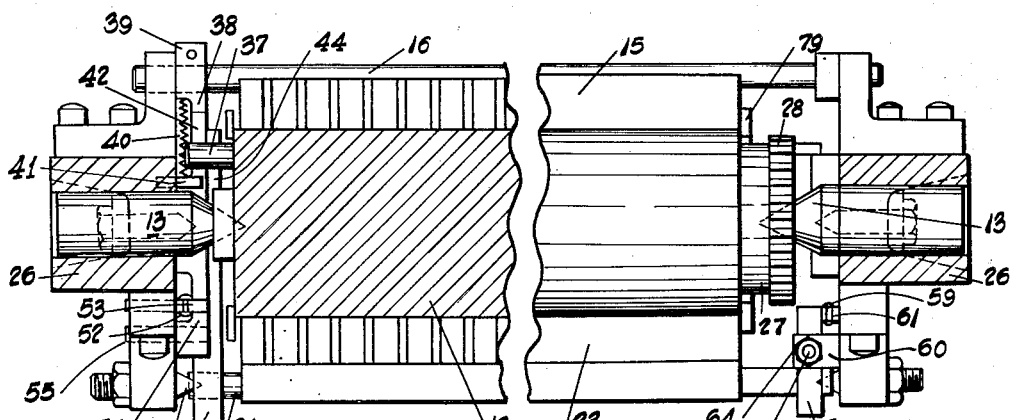
Fig. 6 is a vertical sectional view along the line 6—6 of Fig. 5, looking in the direction of the arrows.

The selector roll 12 is shown in Fig. 6 as being supported at its ends between the trunnions 13 that project from the side frame members 26, with the right-hand end of the roll 12 providing an extension 27 on which is mounted a driving gear 28. As best shown in Figs. 1 and 2, this gear 28 is in mesh with a gear 29 mounted on a shaft 30 that is supported by the frame of the machine between the feed roll shaft 4 and the trunnions 13 for the roll 12. The shaft 30 also carries a pinion 31 in mesh with a gear 32 mounted on the feed roll shaft 4, and the ratio between the gearing is such that the selector roll 12 will make four revolutions for each revolution of the feed roll 3.

The drive shaft 30 extends beyond th right-hand frame 26 of the machine, and is provided with a sprocket 33 connected by a chain 34 to a driving sprocket 35 mounted on a shaft 36 driven from any suitable source of power, such as the electric motor M and its associated reduction gearing. Therefore, the simultaneous drive of the feed roll 3 and the selector roll 12 at a speed ratio of 1 to 4, will result in the delivery of four series of balls to the gauging and sorting mechanism during each complete revolution of the roll 3, and there will next be described the arrangement whereby a cam pin 37 at the left-hand end of the roll 12, see Fig. 6, will operate the baffles 15 and 20 and the gates 17 and 23 to obtain an operating sequence of these elements in the manner previously described with reference to Figs. 7 to 11, inclusive, in describing the progress of a given series of balls through the machine.

The upper baffle 15 is turnable with a shaft 16 rotatably supported at its ends between the frame members 26, as shown in Fig. 6, and the left-hand end of the shaft 16 carries an actuator 38 secured to the shaft 16 by means of an adjustable clamp 39, as shown in Fig. 5. A spring 40 is connected at its ends between the actuator 38 and a fixed pin 41 mounted on the adjacent frame member 26, and the pull of the spring 40 serves to yieldingly maintain the free end of the actuator 38 in engagement with a lever 42 turnable on a pivot 43 so as to bear on the pin 41, in its normal position, with the pin 41 thus serving as a stop for the lever 42.

The free end of the lever 42 extends into the path of movement of the cam pin 37 on the roll 12, so that once for each revolution of the roll 12, the lever 42 will be turned in a counterclockwise direction to cause the engaged actuator 38 on the shaft 16 to move the baffle 15 from the position of Fig. 7 into the position of Fig. 8. Normally, the baffle 15 occupies the position of Fig. 7, so that it will maintain a series of balls B delivered by the feed roll 3 in readiness for delivery to a gauging operation between the rolls 8 and 12, with the turning of the baffle 15 into the position of Fig. 8 in response to actuation of the cam pin 37 occurring four times during each complete revolution of the feed roll 3.

Still referring to Fig. 5, it will be seen that the gate 17, shown in dotted lines, is adapted to be operated by a lever 44 mounted on the left-hand end of the shaft 18. This lever 44 provides an actuating portion 45 behind the end of lever 42, that normally projects into the path of movement of the cam pin 37, with the position of the lever 44, when out of engagement with the pin 37, being determined by the engagement of an arm 46 mounted on the opposite end of the shaft 18, with an adjustable stop 47. The stop 47 is in the form of a stud threaded into a plate 48 mounted on the right-hand frame member 26, with the projection of the stud through the plate 48 determining the position normally occupied by the lever 44. A lock nut 47a provides means for maintaining the stop 47 in an adjusted position, with the pull of a spring 49, which tends to turn the arm 46 in a clockwise direction about the axis of the gate shaft 18, serving to maintain the end of the arm 46 in contact with the lower end of the stop 47.

In Fig. 5, the cam pin 37 is shown as being in engagement with the actuating portion 45 of the lever 44, so as to have turned the arm 46 away from the stop 47 and so as to have moved the gate 17 from the position of Fig. 8, which it normally occupies, into the position of Fig. 9. In this position, the gate 17 is adapted to permit the passage of balls B between the rolls 8 and 12, so as to engage the lower baffle 20, slightly before the arrival of the flat 14 on the roll 12 at a point opposite to the surface of the roll 8. It is to be noted at this point, that the center of the cam pin 37 substantially coincides with the center of the face of the flat 14, so that the movement of the gate 17 from the position of Fig. 8 to the position of Fig. 9 has already occurred by the time that the center of the flat 14 comes opposite to the nearest point on the surface of roll 8, so as to pass all standard size and over- size balls that have been previously held back at the first gauging station. In other words, the gate 17 moves into the position of Fig. 9 immediately after the engagement of cam pin 37 with the actuating portion 45 of the lever 44, and this portion 45 is engaged by the pin 37 before the flat 14 arrives at the ball passing point.

The lower baffle 20 is turnable with the shaft 21 which is rotatably supported at its ends between the frame members 26 in a manner similar to the shaft 16 for the upper baffle 15. The left-hand end of the shaft 21 carries an actuator 50 secured to the shaft 21 by means of an adjustable clamp 51, and a spring 52 is connected at its ends between the actuator 50 and a fixed pin 53 mounted on the adjacent frame member 26. Thus, the pull of the spring 52 serves to yieldingly maintain the free end of the actuator 50 in engagement with a lever 54 turnable on a pivot 55, so as to bear on the pin 53, as shown in Fig. 5, with the pin 53 thus serving as a stop for the lever 54.

The free end of the lever 54 extends into the path of movement of the cam pin 37 on the roll 12, so that once for each revolution of the roll 12, the lever 54 will be turned in a counterclockwise direction to cause the engaged actuator 50 to move the baffle 20 from the position of Fig. 9 into the position of Fig. 10. Normally, the baffle 20 occupies the position of Fig. 9, so that it will maintain a series of standard size and oversize balls delivered by the first gauging operation between rolls 8 and 12 in readiness for releasing these balls for delivery into a gauging position between the rolls 9 and 12. It will be apparent, however, from Fig. 5, that turning of the baffle 20 in response to actuation of the lever 54 by the cam pin 37 does not take place until after the flat 14 on roll 12 has permitted the passage of oversize balls into the chute 25, and the space between the rolls 9 and 12 is clear.

The second gate 23 is turnable with its shaft 24 which, as best shown in Fig. 6, is rotatably supported at its ends between trunnions 56 projecting inwardly from the frame members 26. The left-hand end of the shaft 24 carries a lever 57 similar in construction to the lever 44 which operates the upper gate 17, and the free end of this lever 57 provides an actuating portion 58 normally extending into the path of movement of the cam pin 37. The lever 57 is yieldingly maintained in the position of Fig. 5, where it substantially bears on the surface of the roll 12, by the pull of a spring 59 connected at one end to an arm 60 mounted on the shaft 24 opposite to the lever 57. The other end of the spring 59 is connected to a fixed pin 61 on the right-hand frame member 26, so that the spring 59 tends to maintain the arm 60 in engagement with the end of an adjustable stop 62. This stop 62 is shown in the form of a stud threaded into a fixed lug 63, with a lock nut 64 serving to maintain the stud in any adjusted position.

It will be apparent from a consideration of Fig. 5 that when the cam pin 37 engages the actuating portion 58 of the lever 57 in advance of the arrival of the center of the flat 14 opposite to the roll 9, the gate 23 will be swung from the position of Fig. 10 into the position of Fig. 11, where it is in substantial engagement with the surface of the roll 9. Therefore, by the time the flat 14 permits passage of oversize balls between the rolls 9 and 12, the gate has moved into the position of Fig. 11 to direct these oversize balls into the chute 25.

As previously pointed out, there are four series of balls in the machine at all times, with each series being subjected to gauging operations performed in the sequence illustrated in Figs. 7 to 11, inclusive. That is to say, once the machine has started and has received four consecutive series of balls, thereafter there will always be two series of balls held at the baffles 15 and 20, as shown in Figs. 7 and 9, while two other series of balls are in the gauging positions of Figs. 8 and 10, in readiness to be passed by the flat 14 on the roll 12.

Such a condition is illustrated in perspective in Fig. 3, in which only portions of the operating levers previously described with reference to Fig. 5 are shown in dotted lines. However, in view of the fact that the roll 12, carrying the flat 14 and the cam pin 37, rotates in a clockwise direction, the actuation of baffles 15 and 20 and gates 17 and 23 occurs in a sequence which is the reverse of the sequence previously described with reference to the actual progress of any given series of balls around the roll 12, as illustrated in Figs. 7 to 11, inclusive. In other words, the balls B in traveling through the machine follow a course opposite to the direction of rotation of the selector roll 12, with the result that the cam pin 37 first causes actuation of the lever 57, controlling the lower gate 23, to move the gate into a position in readiness to direct oversize balls into the container 25, with these balls being the remainder of the particular series of balls that was first delivered by the hopper H, in point of time, with respect to the other three series then in the machine.

For ready understanding of the sequence of operations that are performed on any four different series of balls, during the course of one revolution of the selector roll 12, the different series of balls in the machine at any one time are designated as B–I, B–II, B–III, and B–IV, respectively, in Fig. 3. This showing represents the actual positions occupied by the balls of four different series as delivered consecutively by the feed roll slots 5, with the balls B–I of the first series then having reached the second gauging position between rolls 9 and 12, the balls B–II of the second series then being held at baffle 20, the balls B–III of the third series then being in the first gauging position between rolls 8 and 12, and with the balls B–IV of the fourth, or last delivered, series then being held at the upper baffle 15. At this time, it is also assumed that the cam pin 37 is approaching the operating portion 58 of lever 57, with the flat 14 on roll 12 about to reach a position opposite the periphery of the roll 9.

Therefore, as clockwise turning of the roll 12 proceeds from the particular position shown in Fig. 3, the initial swinging of the gate 23 from the position of Fig. 10 into the position of Fig. 11 as the cam pin 37 operates the lever 57, will result in the oversize balls B–I that remain in the first series, being delivered to the container 25 as the flat 14 reaches a point opposite the roll 9.

It will be apparent from a consideration of Fig. 5 that the projecting end of lever 54 is angularly displaced beyond the end of the operating portion 58 of lever 57, as measured in the direction of rotation of the roll 12, so that the cam pin 37 will have released the lever 57 before it engages the lever 54. As a result, the baffle 20 is held in position to hold back the balls B–II of the second series until after the gate 23 has returned to the position of Fig. 10, wherein it will direct standard size balls into the container 22. Therefore, the quick movement of the lever 54, as the cam pin 37 passes under the projecting end thereof, serves to release the balls B–II of the second series, so they will move to the second gauging position as the baffle 20 shifts momentarily to the position of Fig. 10, and then returns to the position of Fig. 9 following release of balls B–II.

Continued movement of the cam pin 37, following release of the lever 54, will result in engagement of the pin 37 with the actuating portion 46 of the lever 44, thereby moving the gate 17 into the position of Fig. 9, slightly in advance of the arrival of the flat 14 opposite the roll 8 to pass standard and oversize balls B–III of the third series between the rolls 8 and 12 for delivery to the lower baffle 20. The gate 17 will remain in this position until the cam pin 37 reaches the position of Fig. 5 wherein the lever 44 is about to be released, just in advance of engagement of the pin with the projecting end of the lever 42. As a result, the upper gate 17 turns to the position of Fig. 3 before the turning of the lever 42 by the cam pin 37 moves the baffle 15 from the position of Fig. 7 into the position of Fig. 8, to permit the balls B–IV of the fourth series to pass into the first gauging position between rolls 8 and 12, wherein undersize balls and balls with flats will be directed into the container 19 by the gate 17, with the balls B–IV remaining in this gauging position until the passage of the flat 14 releases them on the next succeeding revolution of the roll 12.

Following release of the projecting end of the lever 47 by the cam pin 37, the baffle 15 will return to the position of Fig. 7, in readiness to receive the next series of balls rolling down the chute 7, as a result of the next succeeding slot 5 of the feed roll 3 clearing the guide plate 6 of the hopper H.

The above described sequence of operations is repeated for each revolution of the roll 12, during which time the feed roll 3 makes one-fourth of a revolution, so that each series of balls will travel through the machine in a direction opposite to the rotation of roll 12, while being subjected to the operations illustrated in Figs. 7 to 11, inclusive. Therefore, considering the progress of any four consecutive series of balls delivered to the gauging mechanism during each revolution of the feed roll 3, such progress will be summarized below, with reference to Fig. 3, in the terms of what happens during each of four successive revolutions of the roll 12.

Starting with the delivery of the balls B–I of the first series to the chute 7, as they are released from a feed roll slot 5, the balls B–I of this series will remain at baffle 15 while the roll 12 makes its first revolution. Next, balls B–I will move to the first gauging position between rolls 8 and 12, while roll 12 makes its second revolution, during which time balls B–II of the second series arrive at baffle 15.

Coming next to the third revolution of roll 12, balls B–I move to baffle 20, balls B–II move to the first gauging position, while balls B–III of the third series arrive at the upper baffle 15. Finally, as the roll 12 completes its fourth revolution, balls B–I move to the second gauging position, balls B–II pass to baffle 20, balls B–III move to the first gauging position, while balls B–IV of the fourth series arrive at the baffle 15, which is the condition of affairs illustrated in full lines in Fig. 3. Thus, there are four series of balls in the machine at all times, two of which are in the gauging positions, while the other two are being held by the baffles 15 and 20 in readiness for gauging, so that the machine is always in full production, with a delivery rate considerably in excess of the delivery rate of previous machines which are adapted to gauge only one ball at a time of any given series.

As previously pointed out, the gauging rolls 8 and 9 are mounted so as to be capable of adjustment with respect to the selector roll 12 that is rotatably driven between the fixed trunnions 13 through the gear 28. Such adjustment of the rolls 8 and 9 is necessary in order to determine the size of balls that will be passed between the rolls 8 and 12 and 9 and 12, respectively, in accordance with the sequence of operations described above, and obviously any adjustment of rolls 8 and 9 must be capable of extremely accurate control. Fig. 4 shows an arrangement for adjusting the rolls 8 and 9 with respect to roll 12, and since the adjusting means is identical for each roll 8 or 9, only one roll adjusting mechanism will be described in detail.

For the purpose of supporting the rolls 8 and 9, the frame members 26 carry two pairs of brackets 65, with the brackets for the roll 8 facing upwardly, while the brackets for the roll 9 face downwardly. Each pair of brackets 65 serves to support between them a roll yoke 66, which, as best shown in Fig. 12, extends across the machine parallel to the rolls 8 and 9, with each yoke 66 terminating in parallel legs 67, the flat under surfaces of which rest on flat seats 68 provided by the brackets 65. The ends of the rolls 8 and 9 are supported between the legs 67 of the yokes 66 by the centers 10 and 11, respectively, so that the rolls are held against rotation, while at the same time each roll is movable bodily with respect to the selector roll 12, in order to determine the distance between the surfaces thereof for the gauging of balls of predetermined diameter.

The desired adjustment of either roll 8 or 9 is obtained by means of adjusting studs 69 threaded into the legs 67 at each end of a yoke 66, with each stud 69 being freely turnable in a lug 70 provided by each bracket 65. Thus, turning of a stud 69 will serve to shift the associated yoke 66 in one direction or the other, with the lower surface of each yoke leg 67 riding on the seat 68 of its bracket 65. Each yoke leg 67 is adapted to be clamped in any adjusted position by means of a stud 71 threaded into an opening 72 provided in the bracket seat 68, with the stud 71 extending through a slot 73 which, as best shown in Fig. 12, permits movement of a yoke leg 67 on the seat 68 by the stud 69 whenever the clamping stud 71 is loosened. It is also to be noted in Fig. 12, that each bracket lug 70 provides a set screw 74 in threaded engagement therewith, the purpose of which is to engage the end of the yoke 66 after an adjustment thereof has been made, so as to relieve the adjacent adjusting stud 69 of any strain which would tend to loosen the same or disturb the roll adjustment while the machine is in operation.

As previously pointed out, the above-described arrangement for adjusting the upper gauging roll 8 through its supporting yoke 66, is also employed for the lower roll 9, with corresponding parts of each arrangement being identical. Therefore, it is possible by turning the adjusting studs 69 to very accurately adjust the distances between the parallel surfaces of the rolls 8 and 12 and the rolls 9 and 12, so that these distances can be varied within very close tolerances, to permit the passage of undersize balls at the first gauging station, and the passage of standard balls at the second gauging station, all as illustrated in Figs. 8 and 10. After the machine has been adjusted with a predetermined setting between the gauging rolls, it is possible to also adjust the gates 17 and 23 by means of the stop studs 47 and 62, so as to cause the free ends of the gates 17 and 23 to just barely engage the surface of the selector roll 12 as the latter rotates in a clockwise direction. This is the normal position for the gates, except for the short periods when the cam pin 37 engages the gate operating levers 44 and 57, respectively, to swing the gates into the positions of Figs. 9 and 11.

While as previously pointed out, the gauging rolls 8 and 9 are non-rotatably supported between the centers 10 and 11, respectively, one center of each pair is adjustable in its yoke leg 67 to permit the corresponding roll to be turned by hand. Such angular adjustment of either roll 8 or 9 is for the purpose of bringing different portions of the cylindrical roll surface opposite to the rotating selector roll 12, to thereby prevent the relatively stationary roll 8 or 9 from wearing at any one place, as a result of the rotation of the balls in engagement therewith.

One additional adjustment of the machine is provided by the feed plate 2 at the front of the hopper H, the lower edge of which plate is spaced above the hopper bottom 1, to determine the width of the opening O through which the balls B pass on their way to the feed roll slots 5. As best shown in Figs. 1 and 2, the feed plate 2 is secured to the front wall 75 of the hopper H by studs 76, threaded into the wall 75, and passing through slots 77 provided in the plate 2. Thus, the feed plate 2 can be adjusted vertically on the studs 76 to accurately position the lower edge thereof with respect to the hopper bottom 1, with the width of the opening O being set to freely pass the balls B in the hopper. Generally speaking, the width of the opening O will be set by adjustment of the plate 2, so that all balls of any given group that are poured into the hopper will pass through the opening into the feed roll slots 5, even though these balls will differ slightly in size, as previously described.

In order to prevent any balls B from rolling endwise of a series, as each series progresses through the machine in the sequence shown in Figs. 7 to 11, inclusive, end guards 78 are mounted on the frame members 26, as shown in dotted lines in Fig. 4. Each guard 78 provides an arcuate portion 79 which partially encircles the roll 12, without engaging the same, with the portions 79 effectively preventing any tendency for the balls to roll endwise of a series, as they progress through the machine. Each guard 78 provides a flat portion 80 that extends away from the roll 12 and is secured to the adjacent frame member 26 by bolts 81.

As previously pointed out, the hopper H provides a ball-aligning member 6, the function of which is to insure that the balls B are accurately lined up in each feed roll slot 5 before they are delivered to the chute 7. This aligning member 6 is shown in Fig. 3 as being in the form of a strip of resilient material mounted in a holder 82 extending across the front of the hopper, with the lower edge of the member being substantially in engagement with the periphery of the feed roll 3 just above the upper end of the hopper chute 7.

When the machine is in operation, it has been found that as the balls B are fed out of the hopper gate opening O, they are not necessarily in a straight line, and that sometimes a few balls pass through the opening O, in advance of the others entering a feed roll slot 5, so that these balls will rest on top of the series of balls in a given slot. As these extra balls are carried around with the feed roll 3, they will move downwardly in advance of the other balls in the slot, and will be caught by the aligning member 6 which extends the full length of the feed roll 3. It will be apparent from a consideration of Fig. 2 that the width of the hopper gate opening O is less than the length of the slots 5 in the feed roll 3, so that as a slot 5 comes opposite the lower edge of the ball-aligning member 6, the extra balls are wiped into the slot, which is long enough to receive them. This tendency for the balls to spread out in a slot 5, is due to the fact that the balls start to roll out of a slot as they approach the aligning member into the pocket formed between the periphery of the roll 3 and the member 6, which serves to spread the balls and permit any extra balls to be wiped into the slot.

As a slot 5 with a series of balls aligned therein, clears the end of the member 6, the entire series of balls falls into the downwardly inclined chute 7, and since all the balls are released at the same instant, they will retain their alignment as they roll down the chute to engage the upper baffle 15. Therefore, each series of balls, as delivered successively by the slots 5, will reach the baffle 15 in proper alignment, where they will be held momentarily until turning movement of the baffle about its pivot 16 will permit the entire series to travel around the periphery of the roll 12 into the first gauging position.

From the foregoing, it is apparent that by the present invention, there is provided an improved machine for gauging and sorting balls according to their size, with the gauging elements at the first gauging station being also adapted to detect the existence of flats in the ball surfaces, and to discharge such flat balls along with undersize balls. Furthermore, the machine of the present invention is characterized by its ability to gauge and classify a large number of balls at one time, as delivered in successive series to the gauging elements from a feed hopper. Consequently, there are several series of balls always passing through the machine at any one time, with each series being subjected to the same gauging operations in a predetermined sequence, so that extremely uniform results are obtained through operation of the machine to separate the balls taken at random from the hopper into balls of standard size, undersize and flats, and oversize, all within predetermined tolerances, as previously described.

We claim:

1. Apparatus for gauging balls, comprising in combination, a group of cylindrical gauging elements, one of which is rotatably driven and provides a surface flat, while the other elements are non-rotatably supported at different distances from the driven element, means for successively delivering separate series of balls to said gauging elements, means for aligning each series of balls on the moving surface of the driven element in a pregauging position and delivering each series of aligned balls to the space between said driven element and one of the stationary elements, a movable gate for conducting undersize balls and balls with surface flats away from said driven element as they pass between said gauging elements, while standard size and oversize balls remain supported therebetween, and means for moving said gate to direct standard size and oversize balls to the space between said driven element and a second stationary element, as such balls pass between said elements upon the arrival of said flat on the driven element at a point opposite to the surface of the first stationary gauging element.

2. Apparatus for gauging balls, comprising in combination, a group of cylindrical gauging elements, one of which is rotatably driven and provides a surface flat, while the other elements are non-rotatably supported at different distances from the driven element, means for successively delivering separate series of balls to said gauging elements, means for aligning each series of balls on the moving surface of the driven element in a pregauging position and delivering each series of aligned balls to the space between said driven element and one of the stationary elements, a movable gate for conducting undersize balls and balls with surface flats away from said driven element as they pass between said gauging elements, while standard size and oversize balls remain supported therebetween, means for moving said gate to direct standard size and oversize balls to the space between said driven element and a second stationary element as such balls pass between said elements upon the arrival of said flat on the driven element opposite to said first stationary element, a second gate for conducting standard size balls passing between said driven element and said second stationary element, and means for moving said gate to conduct oversize balls passing between said gauging elements upon the arrival of said flat on the driven element opposite to the second stationary element.

3. Apparatus for gauging balls, comprising in combination, a group of cylindrical gauging elements, one of which is rotatably driven and provides a surface flat, while the other elements are non-rotatably supported at different distances from the driven element, means for successively delivering separate series of balls to said gauging elements, means for aligning each series of balls on the moving surface of the driven element in a pregauging position and delivering each series of aligned balls to the space between said driven element and one of the stationary elements, a movable gate for conducting undersize balls and balls with surface flats away from said driven element as they pass between said gauging elements, while standard size and oversize balls remain supported therebetween, means for moving said gate to direct standard size and oversize balls to the space between said driven element and a second stationary element, as such balls pass between said elements upon the arrival of said flat on the driven element opposite to said first stationary element, a movable baffle for supporting standard size and oversize balls in a pregauging position in advance of their arrival at the space between said driven element and a second stationary element, and means for operating said baffle to deliver such balls into said space to permit the passage of standard size balls therethrough, while oversize balls are held until the arrival of said flat on the driven element opposite to the second stationary element.

4. Apparatus for gauging balls comprising in combination, a storage hopper for containing balls, a movable ball feeding element for the reception of a series of balls from said hopper, a group of cylindrical gauging elements, one of which is rotatably driven and provides a surface flat, with the other elements having their cylindrical surfaces at different distances from the driven element, a movable baffle for aligning each series of balls received from said feeding element on the moving surface of the driven element in a pregauging position, and for delivering each series of aligned balls to the space between said driven element and a first one of said other gauging elements, a movable gate for conducting undersize balls away from said driven element, as they pass between said gauging elements, while standard and oversize balls remain supported therebetween, and for directing standard size and oversize balls to the space between said driven element and a second gauging element upon the arrival of the flat on the driven element at a point opposite to the surface of the first gauging element, and means for operating said baffle and gate in sequence to cause one series of balls, as delivered by the feeding element, to be subjected to a gauging operation at one point on the periphery of the driven element while another series of balls is held in a pregauging position.

5. Apparatus for gauging balls comprising in combination, a storage hopper for containing balls, a movable ball feeding element for the reception of a series of balls, from said hopper, a group of cylindrical gauging elements, one of which is rotatably driven and provides a surface flat, with the other elements having their cylindrical surfaces at different distances from the driven element, a movable baffle for aligning each series of balls received from said feeding element on the moving surface of the driven element in a pregauging position, and for delivering each series of aligned balls to the space between said driven element and a first one of said other gauging elements, a movable gate for conducting undersize balls away from said driven element, as they pass between said gauging elements, while standard and oversize balls remain supported therebetween, and for directing standard size and oversize balls to the space between said driven element and a second gauging element, upon the arrival of the flat on the driven element at a point opposite to the surface of the first gauging element, a second movable baffle for aligning each series of balls received from the first gate on the moving surface of the driven element in a pregauging position and for delivering each series of balls to the space between said driven element and said second gauging element, a second movable gate for conducting standard balls away from said driven element as they pass between said gauging elements while oversize balls remain supported therebetween and for directing oversize balls away from said driven element upon the arrival of the flat on the driven element at a point opposite to the surface of the second gauging element, and means for operating said baffles and gates in sequence to cause separate series of balls, as delivered by the feeding element, to be subjected to gauging operations at different points on the periphery of the driven element, while other series of balls are held in different pregauging positions.

References Cited in the file of this patent

UNITED STATES PATENTS

| Number | Name | Date |
|---|---|---|
| 1,173,366 | Machrill | Feb. 29, 1916 |
| 1,607,932 | Whitmore | Nov. 23, 1926 |
| 1,980,815 | McBean | Nov. 13, 1934 |
| 2,091,815 | Hommel | Aug. 31, 1937 |
| 2,099,223 | Paxton | Nov. 16, 1937 |
| 2,331,422 | Reynolds | Oct. 12, 1943 |

FOREIGN PATENTS

| Number | Country | Date |
|---|---|---|
| 212,846 | Great Britain | Mar. 20, 1924 |
| 561,515 | Great Britain | May 23, 1944 |